United States Patent
Ohno

[11] Patent Number: 6,088,169
[45] Date of Patent: Jul. 11, 2000

[54] WIDE-ANGLE ZOOM LENS

[75] Inventor: Kazunori Ohno, Omiya, Japan

[73] Assignee: Fuji Photo Optical Co., Ltd., Omiya, Japan

[21] Appl. No.: 09/249,160

[22] Filed: Feb. 12, 1999

[30] Foreign Application Priority Data

Feb. 27, 1998 [JP] Japan .................................. 10-064423

[51] Int. Cl.$^7$ .............................. G02B 15/14; G02B 9/34
[52] U.S. Cl. .......................... 359/682; 359/686; 359/753; 359/783
[58] Field of Search .................... 359/682, 686, 359/753, 783

[56] References Cited

U.S. PATENT DOCUMENTS

| | | | |
|---|---|---|---|
| 3,771,853 | 11/1973 | Nakamura | 359/682 |
| 4,059,344 | 11/1977 | Yamasita | 359/783 |
| 5,157,550 | 10/1992 | Tsuchida et al. | 359/686 |
| 5,721,642 | 2/1998 | Shibayama et al. | 359/686 |
| 5,798,871 | 8/1998 | Shibayama et al. | 359/686 |
| 5,870,234 | 2/1999 | Schittof | 359/753 |

FOREIGN PATENT DOCUMENTS

| | | |
|---|---|---|
| 6-201993 | 7/1994 | Japan . |
| 7-113956 | 5/1995 | Japan . |
| 9-179026 | 7/1997 | Japan . |

*Primary Examiner*—Georgia Epps
*Assistant Examiner*—Evelyn A. Lester
*Attorney, Agent, or Firm*—Arnold International; Bruce Y. Arnold

[57] ABSTRACT

A wide-angle zoom lens is disclosed having four lens groups of negative, positive, positive, and positive refractive power, in order from the object side. By satisfying prescribed conditions, the overall length as well as the outer diameter of the wide-angle zoom lens can be kept small, the number of lens elements required can be minimized so as to keep manufacturing costs low, yet a high-quality image is provided over the entire range of zoom. During zooming, the first and fourth lens groups remain in a fixed position while the second and third lens groups are moved along the optical axis. The first lens group $G_1$ includes at least one negative lens element with a concave surface of strong curvature on the image side. The second lens group $G_2$ has at least one biconvex lens. The third lens group $G_3$ may consist of a single positive lens. The following conditions are satisfied:

$$-2.5 < f_1/f_w < -1.5$$

$$2.0 < f_2/f_w < 4.0$$

where $f_1$ of the focal distance of the first lens group $G_1$, $f_w$ is the focal distance of the zoom lens at the wide-angle end, and $f_2$ is the focal distance of the second lens group $G_2$.

Further, a diaphragm which serves as an aperture stop may be positioned between the first lens group and the second lens group to vary the brightness in the image plane as well as to control certain aberrations, and to ensure the outer diameter of the first lens group is small

9 Claims, 12 Drawing Sheets

Embodiment 1

WIDE-ANGLE ZOOM LENS

BACKGROUND OF THE INVENTION

There has been a remarkable development in electronic projection image technology in recent years and, with the arrival of the electronic information age, the electronic still camera has become popular. However, electronic still cameras are somewhat expensive for their performance as compared with a photographic camera that uses silver chloride film, and this has been an obstacle to the electronic still camera being even more popular. Because of this, the development of an inexpensive zoom lens that is suited for an electronic still camera is particularly desired.

There have been several examples of prior art zoom lenses suitable for use in electronic still cameras, video cameras, and the like. For example, in Japan Laid-Open Patent Publication H07-113956, there is disclosed a zoom lens having, in order from the object side, a negative first lens group and positive second lens group. This wide-angle zoom lens requires at least seven lens elements. In addition, in Japan Laid-Open Patent Publication H09-179026 there is disclosed a four-group zoom lens, with the groups having negative, positive, negative, and positive power, respectively, in order from the object side. This zoom lens also requires at least 7 lens elements.

These prior art zoom lenses are neither necessarily compact nor inexpensive. In zoom lenses used in electronic still cameras and the like, wide-angle zoom lenses are required which have a short focal distance with respect to the size of the image plane, a small number of lens elements so as to be compact, and the zoom lens must yield a high-quality image. However, at the wide-angle end, because the lens outer diameter becomes large when the size of the image picture plane is made large, there is a possibility of losing compactness as a result of enlargement of the lens barrel diameter.

Although not a zoom lens, a wide-angle lens having two focal points is disclosed in Japan Laid-Open Patent Publication H06-201993. This lens has at least seven elements in three lens groups, with the lens groups being arranged, in order from the object side, as follows: a negative first lens group, a positive second lens group, and a positive third lens group. However, this wide-angle lens cannot be said to be compact due to its comparatively large front lens group diameter.

BRIEF SUMMARY OF THE INVENTION

A first object of the present invention is to provide an inexpensive, wide-angle zoom lens that is compact and has high performance. A second object is to make such a lens using only a small number of lens elements. A third object of the invention is to keep the zoom lens compact by keeping the overall lens length as well as the outer diameter of the lens elements, including those in the front lens group, small.

BRIEF DESCRIPTION OF THE DRAWINGS

The present invention will become more fully understood from the detailed description given below and the accompanying drawings, which are given byway of illustration only and thus are not limitative of the present invention, wherein.

DETAILED DESCRIPTION

Figure 1:
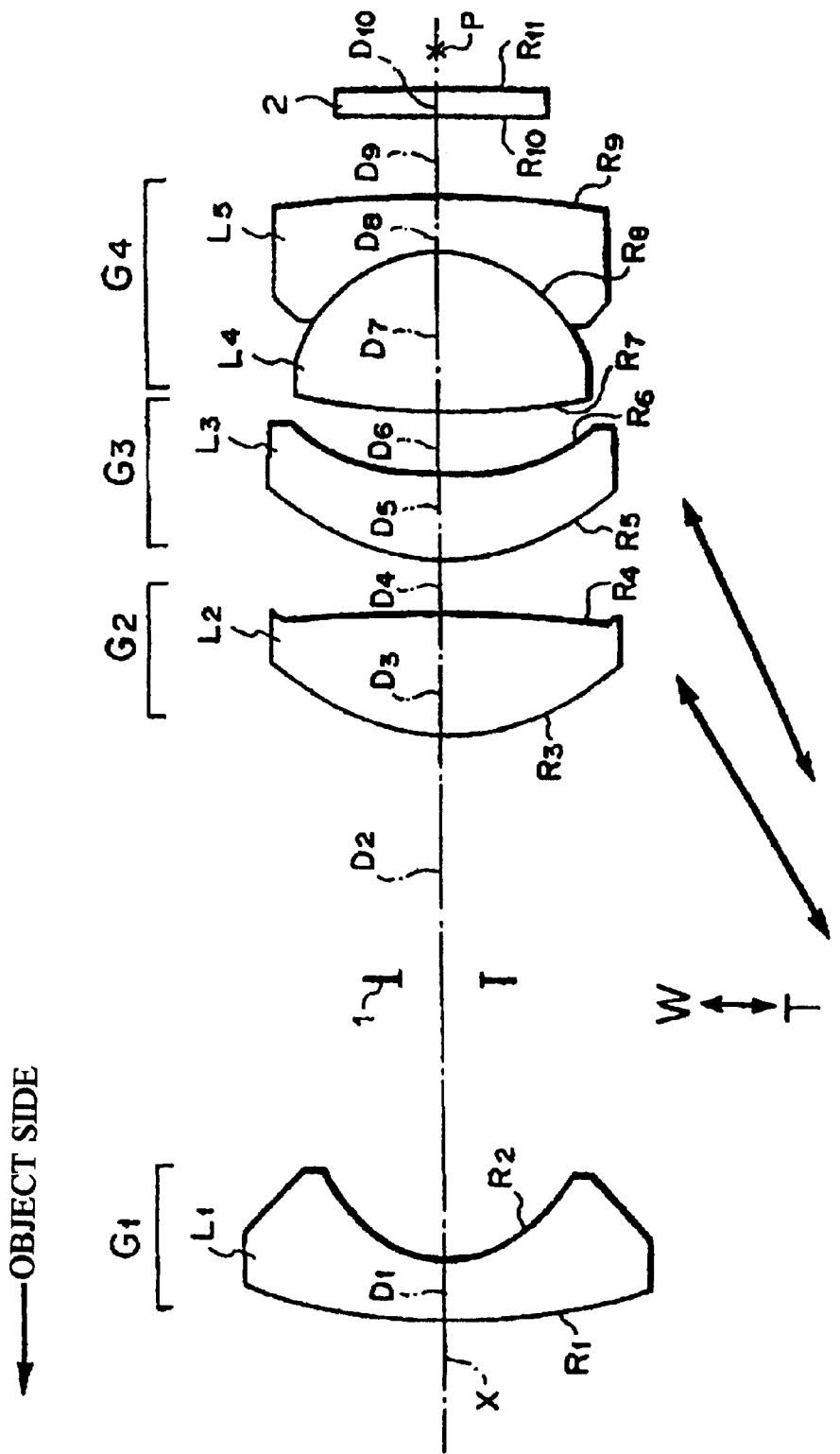
FIG. 1 shows the basic lens element structure of the wide-angle zoom lens of Embodiment 1.

The present invention is a wide-angle zoom lens for use in television cameras, photographic cameras, and the like, and is particularly suited as a lens for electronic still cameras. The wide-angle zoom lens of the invention has a simple structure with favorable characteristics, and is inexpensive to produce as a result of its low number of lens elements. The wide-angle zoom lens includes, in order from the object side: a first lens group which has negative refractive power, a second lens group which has positive refractive power, a third lens group which has positive refractive power, and a fourth lens group which has positive refractive power. When there is zooming, the first lens group and the fourth lens group are fixed on the optical axis, and the second lens group and the third lens group are moved along the optical axis to achieve a variable magnification while maintaining the image at a fixed position The first lens group has at least one lens element of negative refractive power, with its opposite surfaces having different radii of curvature, and with the surface of stronger curvature being concave and on the image side. The second lens group has at least one lens element that is biconvex, and the third lens group may consists of a single positive lens element. In addition, the following Conditions (1) and (2) are satisfied:

$$-2.5 < f_1/f_w < -1.5 \quad \text{Condition (1)}$$

$$2.0 < f_2/f_w < 4.0 \quad \text{Condition (2)}$$

where $f_1$ is the focal distance of the first lens group $f_w$ is the focal distance of the zoom lens at the wide angle end, and $f_2$ is the focal distance of the second lens group.

Further, it is preferred that there be a diaphragm 1, which serves as an aperture stop, located at a fixed position between the first lens group and the second lens group, and wherein the following Conditions (3) and (4) are also satisfied.

$$1.1 < D_e/f_w < 2.1 \quad \text{Condition (3)}$$

$$2.7 < D_{2w}/f_w < 4.3 \quad \text{Condition (4)}$$

where $D_e$ is the on-axis distance, from the surface of the first lens group that is nearest the image-side, to the diaphragm;

$f_w$ is as defined above; and $D_{2w}$ is the on-axis distance between the first lens group and the second lens group, at the wide-angle end.

The first lens group may consist of only a single negative lens element with a concave surface on the image side and with at least one surface of the negative lens element being aspherical. The second lens group may consist of a single biconvex lens element, with at least one surface thereof being aspherical. The first lens group and the second lens group may each have at least one lens element that is composed of an organic material And, the fourth lens group may consist of two lens elements that are cemented together.

By satisfying Conditions (1) and (2) the overall length of the wide-angle zoom lens as well as the outer diameter thereof including the outer diameter of the first lens group, are kept small, thereby making it possible to provide a wide-angle zoom lens where the number of lens elements is small, there is high performance, the zoom lens is compact and, moreover, the zoom lens is inexpensive to produce.

In the first lens group, there is at least one negative lens element having different radii of curvature on its opposite sides, with the side having stronger curvature being concave and on the image side. This shape, in conjunction with a nearby aperture stop (discussed below), minimizes curvature of field as well as other aberrations such as coma. The diaphragm 1, which serves as an aperture stop, ensures that the outer diameter of the first lens group may be small.

The second lens group must include at least one positive lens element for giving this lens group overall positive refractive power. This lens element must have its surface on the object side be of strong convex curvature in order to negate a strong dispersion affect from the negative refractive power of the first lens group. In addition, this lens (which is arranged nearer the object side at the telephoto end than at the wide-angle end) is moved away from the aperture diaphragm 1 at the wide-angle end. Since this convex lens is near the aperture stop at the telephoto end, it must disperse strong positive refractive power in order to maintain a favorable balancing of the spherical aberration and curvature of field over the entire range of zoom. Moreover, in order to keep the number of lens elements as few as possible, this convex lens is made to be a biconvex lens.

The third lens group is a correction group that moves during zooming in order that the image position is maintained at a fixed axial position. This third lens group has weak refractive power, and may consist of a single positive lens. Condition (1) regulates the ratio of the focal distance $f_1$ of the first lens group divided by the focal distance $f_w$ of the zoom lens at the wide-angle end. Condition (2) regulates the ratio of the focal distance $f_2$ of the second lens group divided by the focal distance $f_w$ of the zoom lens at the wide-angle end. In Condition (1), when the value of $f_1/f_w$ falls below the lower limit, the negative refractive power becomes weak and the movement amount of the second lens group must become large in order to maintain the zoom ratio at the prescribed size. This would require that the overall length of the zoom lens be large, and thus defeat the objective of the lens being compact. On the other hand, when the value of $f_1/f_w$ exceeds the upper limit, the negative refractive power of the first lens group and the positive refractive power of the second lens group each become too strong, making it impossible to maintain a high-quality image over the entire range of zoom.

In Condition (2), when the value of $f_2/f_w$ drops below the lower limit, the positive refractive power of the second lens group becomes too large, making it impossible to favorably correct the spherical aberration and curvature of field over the entire range of zoom. On the other hand, when the value of $f_2/f_w$ exceeds the upper limit, it becomes impossible to cancel the negative refractive power of the first lens group. In addition, since the zoom movement amount of the third lens group becomes large, the outer diameter of the third lens group becomes large, again defeating the objective of the lens being compact.

Conditions (3) and (4) relate to a diaphragm that is preferably arranged following the first lens group. By satisfying these conditions, a wide-angle zoom lens can be provided that is compact as well as inexpensive to produce, in that only a small number of lens elements are required. More specifically, Condition (3) regulates the ratio of the distance $D_e$ (measured from the on-axis lens element surface of the first lens group nearest the image, to the diaphragm) divided by the focal distance $f_w$ of the zoom lens at the wide-angle end. When the value of $D_e/f_w$ drops below the lower limit, the back focus (as measured along the optical axis X from the surface 11 of filter 2 to the image point P) becomes too small, and sufficient space cannot be maintained for positioning a detecting surface of a photographic element, such as a CCD array, at the image plane. In addition, when the space between the first lens group and second lens group is enlarged for maintaining sufficient back focus, then the outer diameter of the second lens group becomes too large.

On the other hand, when the value of $D_e/f_w$ exceeds the upper limit, the first lens group is too far from the diaphragm 1 which serves as the aperture stop. This causes the outer diameter of the first lens group to become too large as well as the back focus of the entire system to become too large, thereby defeating the objective of the zoom lens being compact.

Condition (4) regulates the overall length of the zoom lens as well as the outer diameter thereof In other words, Condition (4) regulates the ratio $D_{2w}$ of the distance between the first lens group and second lens group at the wide-angle end divided by the focal distance $f_w$ of the zoom lens at the wide-angle end. When the value of $D_{2w}/f_w$ drops below the lower limit, the respective movement amounts of the second lens group and third lens group are too small, and a desirable zoom ratio cannot be obtained. When trying to obtain a desirable zoom ratio, the respective refractive powers of the second lens group and third lens group become too large, and a high quality image cannot be provided. On the other hand, when the value of $D_{2w}/f_w$ exceeds the upper limit, the respective movement amounts of the second lens group and third lens group during zooming are too large, again defeating the objective of the zoom lens being compact.

However, by making at least one surface of the negative lens element of the first lens group aspherical, even when the first lens group consists only of this single lens element, various aberrations such as distortion, curvature of field, and the like can be favorably corrected over the entire range of zoom.

Also, by making at least one surface of the biconvex lens in the second lens group be aspherical, even when the second lens group includes only this lens element, a wide-angle zoom lens can be provided which has good optical performance.

By forming the aspherical lens elements of the first and second lens groups of an organic material or materials, the manufacturing costs can be greatly reduced As will be clear from the detailed Embodiments of the invention that follow, in the case where the first lens group consists of a single, aspherical, negative lens element made from an organic material, and the second lens group consists of a single, aspherical, positive lens element made from an organic material, there will be little change in focus with changes in temperature. Hence, a wide-angle zoom lens can be provided having a more favorable optical performance.

In order to maintain favorable chromatic aberrations over the entire range of zoom, the fourth lens group needs to be made achromatic. However, when trying to structure the fourth lens group by using only two lens elements that are positive and negative, the refractive power of the respective lenses becomes extremely strong in order to correct for chromatic aberration When the respective lens elements are arranged as separated lens elements, spherical aberration and the like become strong, and there is prominent deterioration in image-quality. Accordingly, the positive and negative lens elements that form the fourth lens group are cemented together. Hence, as will be clear from the detailed embodiments that follow, a wide-angle zoom lens can be provided having favorable imaging performance over the entire range of zoom. According to the present invention, by using only four lens groups and five lens elements, a zoom lens can be provided that is well-suited, for example, for use in an electronic still camera.

Figure 2:
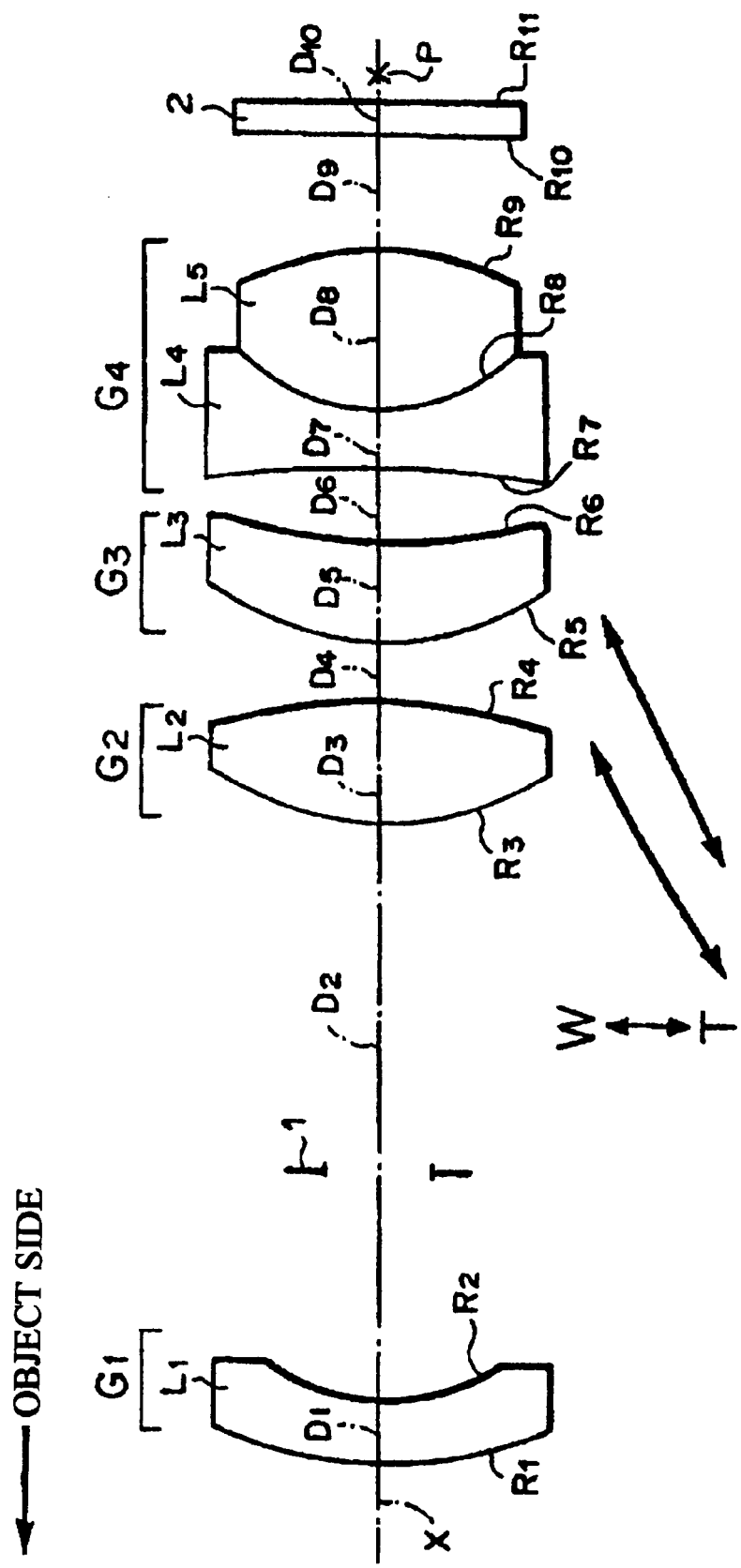
FIG. 2 shows the basic lens element structure of the wide-angle zoom lens of Embodiment 2.
Figure 3:
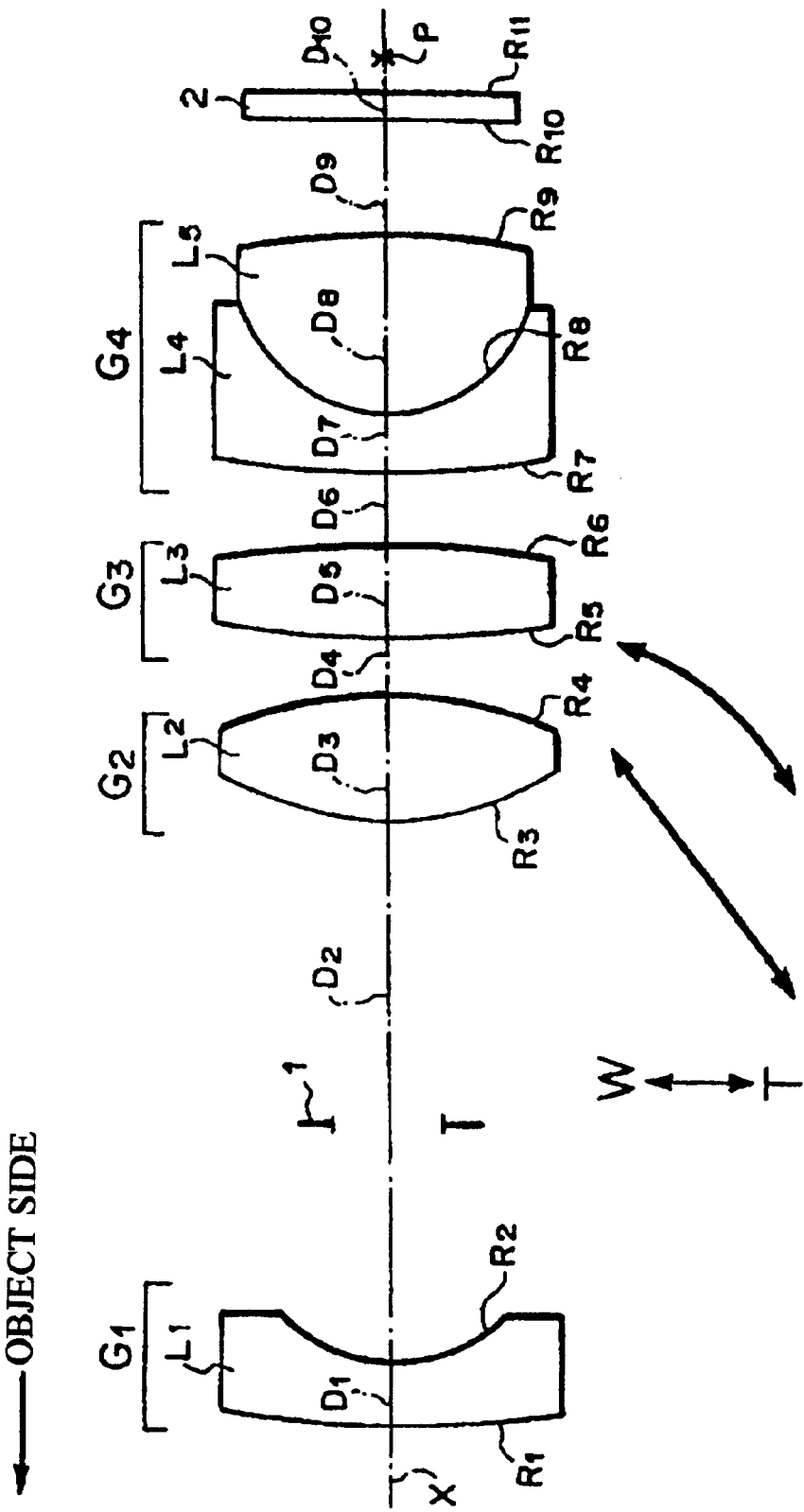
FIG. 3 shows the basic lens element structure of the wide-angle zoom lens of Embodiment 3.

FIGS. 1 to 3 illustrate the basic lens element structure of the wide-angle zoom lens relating to Embodiments 1 to 3, respectively, where W refers to the wide angle end, T refers to the telephoto end, X is the optical axis, and P is the image-formation position.

Embodiment 1

As shown in FIG. 1, the wide angle zoom lens of Embodiment 1 includes, in order from the object side, a first lens group $G_1$ which has negative refractive power, a second lens group $G_2$ which has positive refractive power, a third lens group $G_3$ which has positive refractive power, and a fourth lens group $G_4$ which has positive refractive power. When there is zooming, the first lens group $G_6$ and the fourth lens group $G_4$ are fixed on the optical axis, and the second lens group $G_2$ and the third lens group $G_3$ move along the optical axis, as illustrated Thus a variable focal distance is achieve While maintaining a fixed position of the image plane.

As shown in FIG. 1, the first lens group $G_1$ is formed of a first lens element $L_1$ which consists of a negative meniscus lens element having its surface of stronger curvature be concave and on the image side. The second lens group $G_2$ is formed of a second lens element $L_2$ which consists of a biconvex lens element having different radii of curvature on its opposite sides, with the surface of stronger curvature on the object side. The third lens group $G_3$ is formed of a third lens element $L_3$, which consists of a positive meniscus lens element with its concave surface on the image side. And, the fourth lens group $G_4$ is formed of a fourth lens element $L_4$ which is biconvex, and which is cemented to a fifth lens element $L_5$ which is a negative meniscus lens element having its concave surface on the object side.

A diaphragm 1 is positioned between the first lens group $G_6$ and the second lens group $G_2$. The diaphragm 1 serves as the aperture stop and determines the brightness of the zoom lens. In addition, the first lens element $L_1$ and second lens element $L_2$ are preferably formed from organic materials. Furthermore, the wide angle zoom lens relating to Embodiment 1 is designed to use a quarter-inch diameter CCD array photographic element. An IR cut-off filter 2 is arranged between the zoom lens and the photographic element. However, a low-pass filter having an even between the zoom lens and the photographic element. However, a low-pass filter having an even greater thickness may be used in lieu of the IR cut-off filter 2.

Table 1, below, shows the surface number # in order from the object side, the radius of curvature R in mm near the optical axis of each surface, the on-axis surface spacing D, the index of refraction $N_d$ for the d-line, and the Abbe constant $v_d$ for each lens element. Also, the spacing $D_e$ of the diaphragm 1 from the image-side of the first lens group is indicated. Those surfaces having a * to the right of the surface number are made to be aspheric with a shape defined by Equation A below.

$$X = Ch^2/(1+(1-KC^2h^2)^{1/2}) + a_4h^4 + a_6h^6 + a_8h^8 + a_{10}h^{10} \quad \text{Equation A}$$

where

X is the distance (in mm) of a point on the aspherical surface from the tangential plane at the lens element surface vertex, C is the curvature (1/R) of the aspherical surface vertex near the optical axis, h is the height (in mm) from the optical axis K is the eccentricity $a_4, a_6, a_8, a_{10}$ are the aspherical coefficients of the fourth, sixth, eighth, and tenth exponential number terms, respectively, for the aspheric surface.

TABLE 1

| # | R | D | $N_d$ | $v_d$ |
|---|---|---|---|---|
| 1 | 13.3610 | 1.100 | 1.49023 | 57.6 |
| 2* | 2.2525 | $D_2$ (variable) | | |
| 3 | 5.0223 | 2.2500 | 1.49023 | 57.6 |
| 4* | −36.6484 | $D_4$ (variable) | | |
| 5 | 4.7555 | 1.6500 | 1.49023 | 57.6 |
| 6* | 8.9267 | $D_6$ (variable) | | |
| 7 | 15.9766 | 3.0000 | 1.77250 | 49.6 |
| 8 | −3.0277 | 1.0000 | 1.84666 | 23.8 |
| 9 | −22.9313 | 2.0000 | | |
| 10 | ∞ | 0.5500 | 1.51633 | 64.1 |
| 11 | ∞ | | | |

$D_e$ = 4.9033 mm (on the image-side from surface #2)

In Table 2 below, the values for each of the constants C, K, $a_4$, $a_6$, $a_8$, and $a_{10}$ of Equation (A) above are given for the aspheric surfaces indicated in Table 1.

TABLE 2

| # | C | K | $a_4$ | $a_6$ | $a_8$ | $a_{10}$ |
|---|---|---|---|---|---|---|
| 2 | 0.4439512 | 0.093275 | $3.3203 \times 10^{-3}$ | $3.5547 \times 10^{-4}$ | $1.1938 \times 10^{-8}$ | $1.2000 \times 10^{-13}$ |
| 4 | −0.0272863 | −5.915760 | $-3.9728 \times 10^{-4}$ | $1.1265 \times 10^{-4}$ | $1.8674 \times 10^{-8}$ | $2.4461 \times 10^{-14}$ |
| 6 | 0.1120235 | −17.817060 | $7.6123 \times 10^{-3}$ | $1.5160 \times 10^{-5}$ | $-3.2824 \times 10^{-7}$ | $-1.5530 \times 10^{-10}$ |

In the upper section of Table 3, below, are given the focal distance f of the wide-angle zoom lens, the f-number $F_{NO}$, the half-image angle ω, the group spacings $D_2$, $D_4$ and $D_6$, and the back focus Bf, as measured on-axis from surface 11 of filter component 2, for each of the wide-angle end (WIDE), the mid-position (MID), and the telephoto end (TELE) of Embodiment 1. In the lower section of Table 3 are given the values corresponding to the above conditions (1) to (4).

TABLE 3

| | WIDE | MID | TELE |
|---|---|---|---|
| f | 2.808 | 3.926 | 5.377 |
| $F_{NO}$ | 2.81 | 3.93 | 5.38 |
| ω | 35.5° | 27.0° | 20.4° |
| $D_2$ | 10.0068 | 7.4139 | 5.4033 |
| $D_4$ | 1.0500 | 2.3205 | 1.9779 |
| $D_6$ | 1.2750 | 2.5974 | 4.9506 |
| Bf | 0.253 | 0.253 | 0.253 |

| | | |
|---|---|---|
| $f_1/f_w$ | = | −2.03 |
| $f_2/f_w$ | = | 3.27 |
| $D_e/f_w$ | = | 1.75 |
| $D_{2w}/f_w$ | = | 3.56 |

As is clearly shown in the lower section of Table 3, the value of $f_1/f_w$ is −2.03, the value of $f_2/f_w$ is 3.27, the value of $D_e/f_w$ is 1.75, and the value of $D_{2w}/f_w$ is 3.56, which respectively satisfy the above Conditions (1)–(4).

Figure 4:
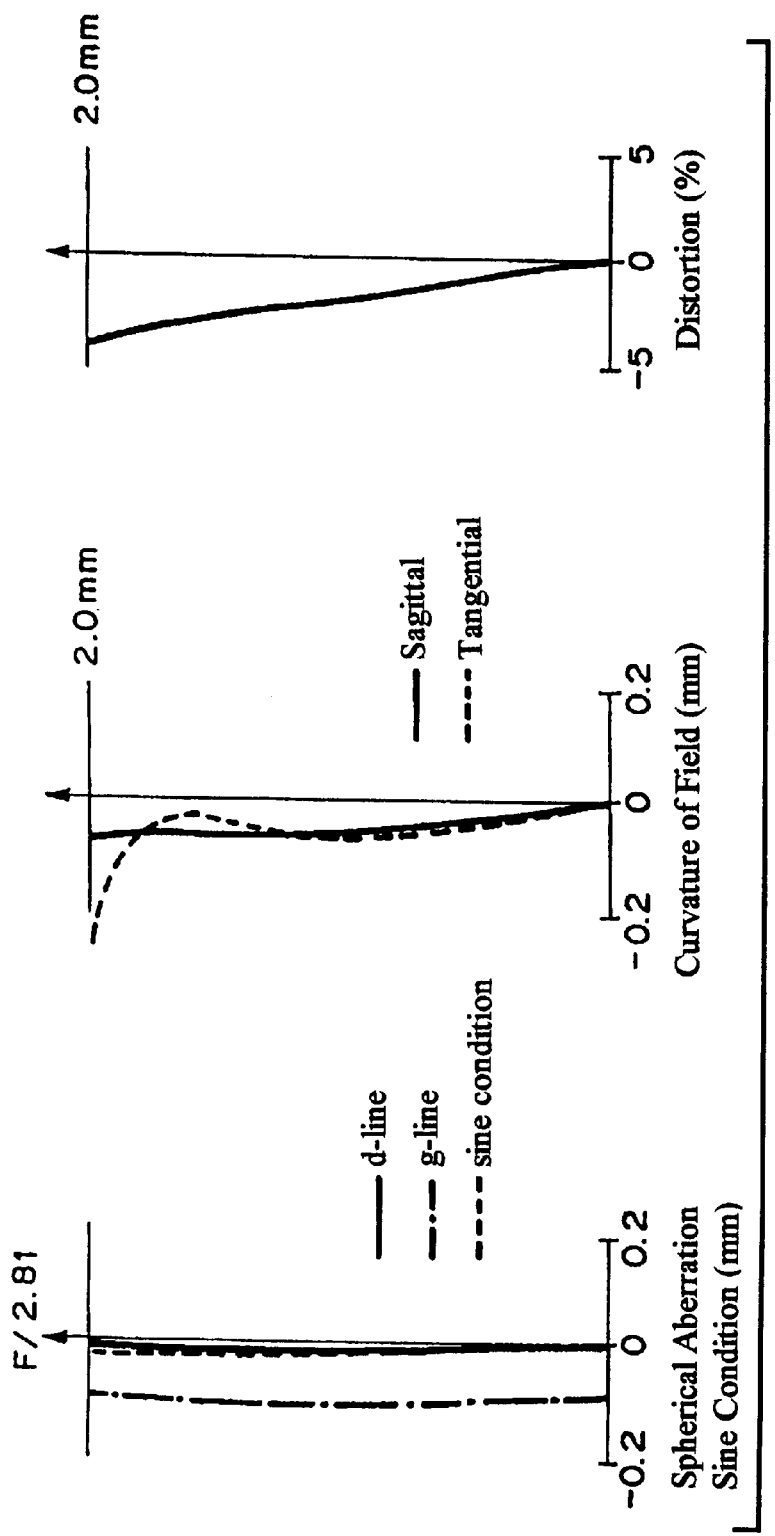
FIG. 4 shows the spherical aberration and sine condition, curvature of field, and distortion at the wide-angle end of the zoom lens of Embodiment 1.
Figure 5:
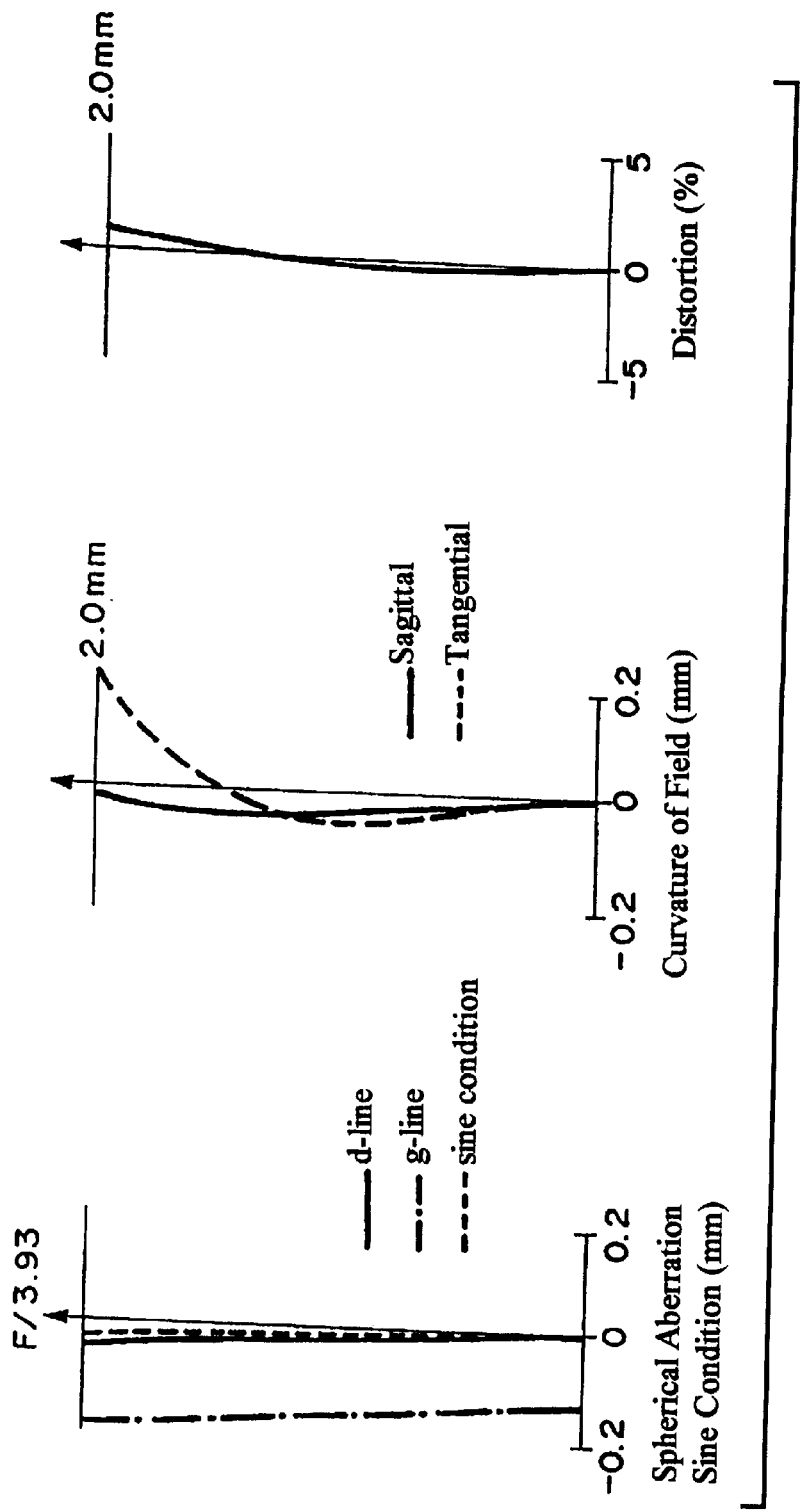
FIG. 5 shows the spherical aberration and sine condition, curvature of field, and distortion at the mid-position of the zoom lens of Embodiment 1.
Figure 6:
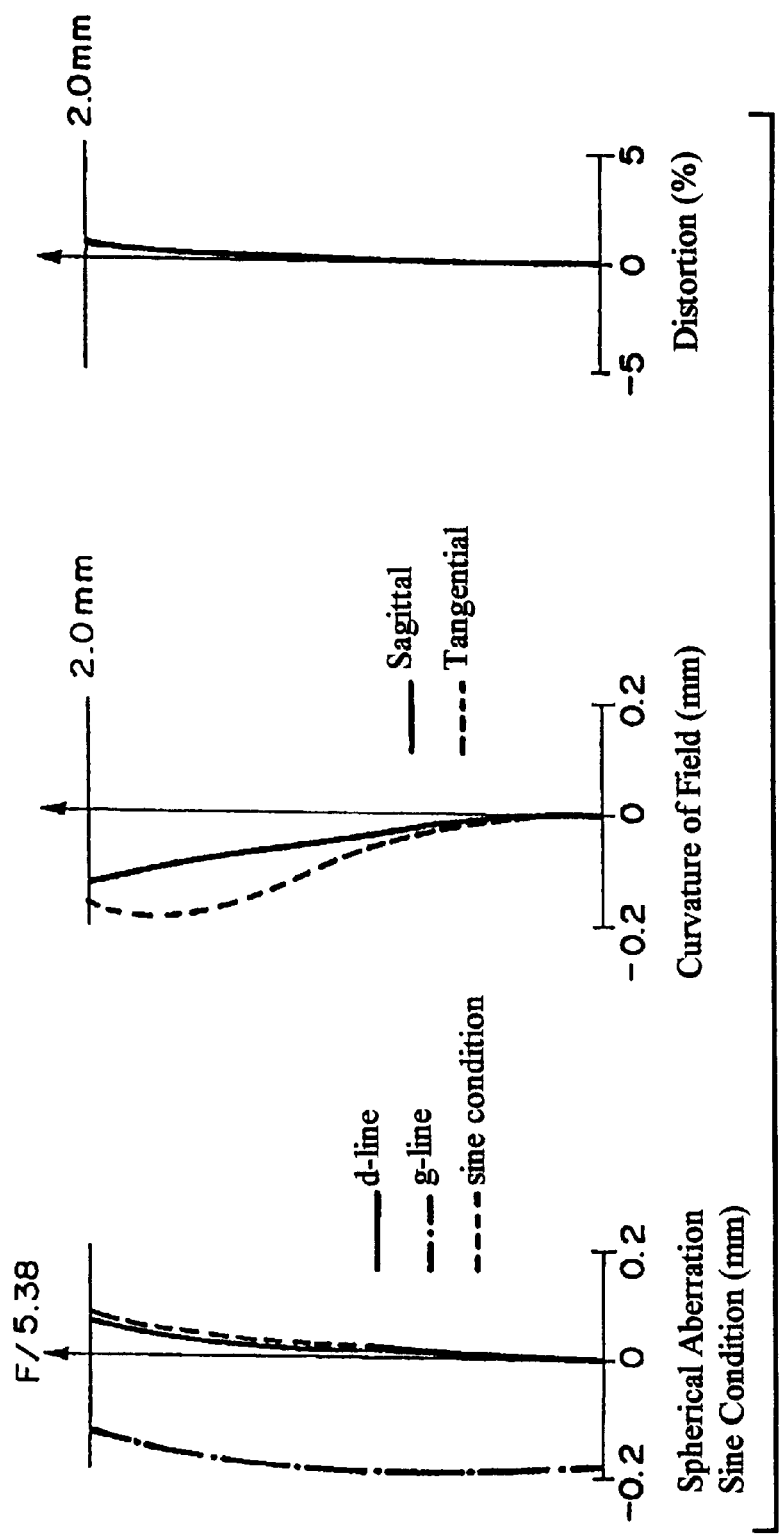
FIG. 6 shows the spherical aberration and sine condition, curvature of field, and distortion at the telephoto end of the zoom lens of Embodiment 1.

FIGS. 4–6 illustrate the spherical aberration and sine condition, curvature of field, and distortion of the wide-angle zoom lens of Embodiment 1 at the wide-angle end (WIDE), the mid-position (MID) and the telephoto end (TELE), respectively. As is made clear in FIGS. 4–6, each of the aberrations is favorable for the wide-angle zoom lens of Embodiment 1.

Embodiment 2

As shown in FIG. 2, the wide-angle zoom lens of Embodiment 2 is made using lens elements almost identical in structure that of Embodiment 1, but differs in that the fourth lens group $G_4$ is composed of a fourth lens element $L_4$ that is biconcave and is cemented to a fifth lens element $L_5$ that is biconvex.

Again in this embodiment, the first lens element $L_1$ and second lens element $L_2$ are preferably formed from organic materials. Furthermore, the wide angle zoom lens of Embodiment 2 is also designed to use a quarter-inch diameter CCD array photographic element, and an IR cut-off filter 2 is arranged in the gap between the zoom lens and the photographic element. Once again, however, a low-pass filter having an even greater thickness may be used in lieu of the IR cut-off filter 2.

Table 4, below, shows the surface number # in order from the object side, the radius of curvature R in mm near the optical axis of each surface, the on-axis surface spacing D, the index of refraction $N_d$ for the d-line, and the Abbe constant $v_d$ for each lens element. Also, the spacing $D_e$ of the diaphragm 1 from the image-side of the first lens group is indicated. Those surfaces having a * to the right of the surface number are made to be aspheric with a shape defined by Equation A above.

TABLE 4

| # | R | D | $N_d$ | $v_d$ |
|---|---|---|---|---|
| 1 | 7.5862 | 1.100 | 1.58364 | 30.3 |
| 2* | 2.2049 | $D_2$ (variable) | | |
| 3 | 5.4069 | 2.2500 | 1.49023 | 57.6 |
| 4* | −10.3207 | $D_4$ (variable) | | |
| 5 | 5.1943 | 1.6500 | 1.49023 | 57.6 |
| 6* | 10.3105 | $D_6$ (variable) | | |
| 7 | −24.6432 | 1.0000 | 1.84667 | 23.8 |
| 8 | 2.9933 | 3.0000 | 1.71300 | 53.9 |
| 9 | −5.6010 | 2.0000 | | |
| 10 | ∞ | 0.5500 | 1.51633 | 64.1 |
| 11 | ∞ | | | |

$D_e$ = 4.0712 mm (on the image side from surface #2)

In Table 5 below, the values for each of the constants C, K, $a_4$, $a_6$, $a_8$, and $a_{10}$ of Equation (A) are given for the aspheric surfaces indicated in Table 4.

TABLE 5

| # | C | K | $a_4$ | $a_6$ | $a_8$ | $a_{10}$ |
|---|---|---|---|---|---|---|
| 2 | 0.4535353 | 0.286704 | $8.3804 \times 10^{-3}$ | $-2.9339 \times 10^{-3}$ | $1.0524 \times 10^{-3}$ | $-1.1307 \times 10^{-4}$ |
| 4 | -0.0968927 | -11.744060 | $1.6003 \times 10^{-4}$ | $3.4612 \times 10^{-5}$ | $7.8185 \times 10^{-7}$ | $-4.2470 \times 10^{-8}$ |
| 6 | 0.0969885 | -18.184790 | $5.2760 \times 10^{-3}$ | $-7.1586 \times 10^{-5}$ | $2.4015 \times 10^{-5}$ | $-9.7540 \times 10^{-7}$ |

In the upper section of Table 6, below, are given the focal distance f of the wide-angle zoom lens, the f-number $F_{NO}$, the half-image angle ω, the group spacings $D_2$, $D_4$ and $D_6$, and the back focus Bf as measured on-axis from surface 11 of filter component 2, for each of the wide-angle end (WIDE), the mid-position (MID), and the telephoto end (TELE) of Embodiment 2. In the lower section of Table 6 are given the values corresponding to the above Conditions (1) to (4).

TABLE 6

|  | WIDE | MID | TELE |
|---|---|---|---|
| f | 2.900 | 5.054 | 6.500 |
| $F_{NO}$ | 2.90 | 5.05 | 6.50 |
| ω | 34.6° | 21.6° | 15.7° |
| $D_2$ | 10.2720 | 6.1915 | 4.5862 |
| $D_4$ | 1.0500 | 4.2464 | 4.1207 |
| $D_6$ | 1.2750 | 2.1591 | 3.8901 |
| Bf | 0.463 | 0.463 | 0.463 |
| $f_1/f_w$ | = | | -1.99 |
| $f_2/f_w$ | = | | 2.62 |
| $D_e/f_w$ | = | | 1.40 |
| $D_{2w}/f_w$ | = | | 3.54 |

As is clearly shown in the lower section of Table 6, the value of $f_1/f_w$ is -1.99, the value of $f_2/f_w$ is 2.62, the value of $D_e/f_w$ is 1.40, and the value of $D_{2w}/f_w$ is 3.54, which respectively satisfy the above Conditions (1)–(4).

Figure 7:
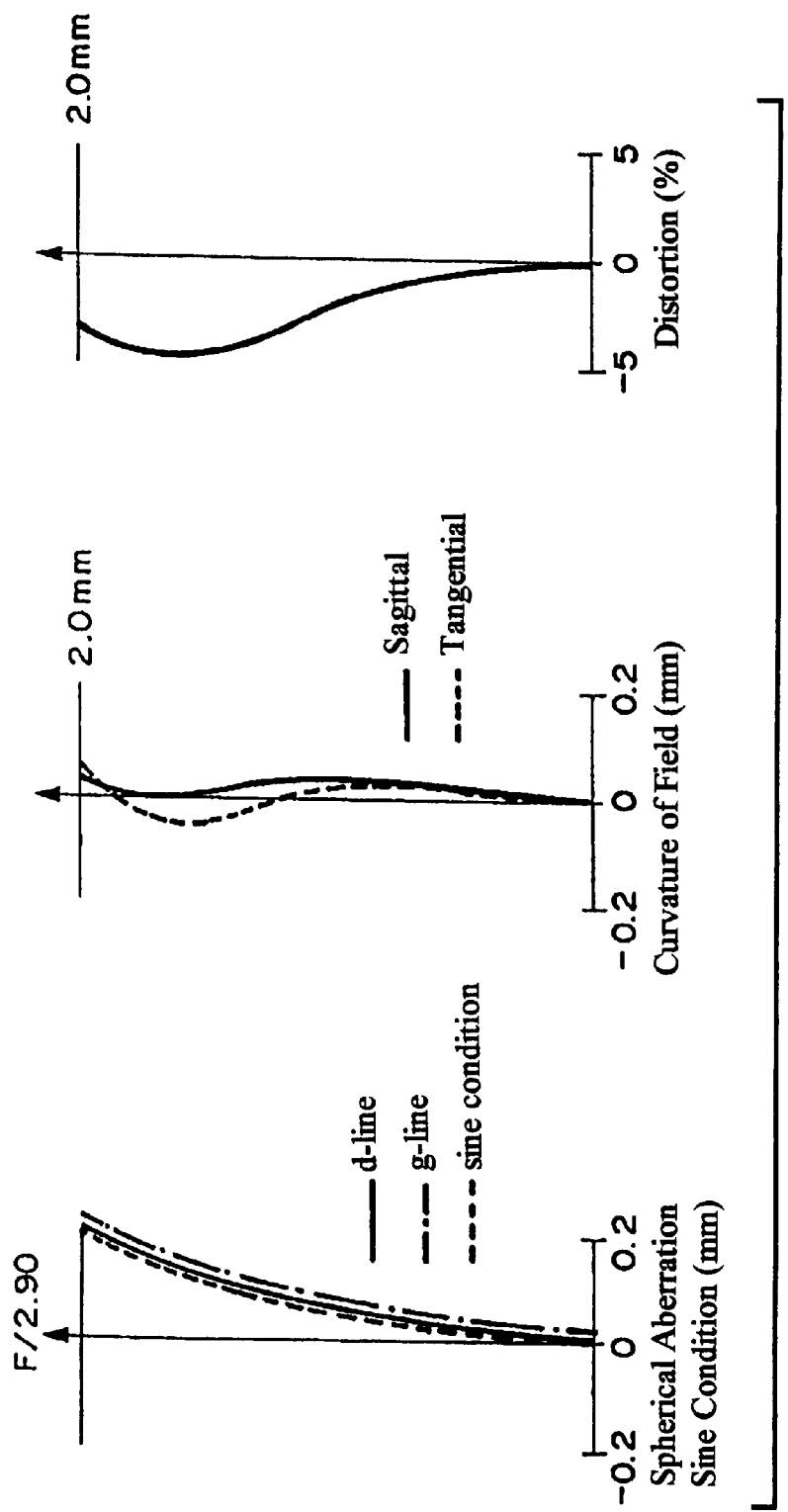
FIG. 7 shows the spherical aberration and sine condition, curvature of field, and distortion at the wide-angle end of the zoom lens of Embodiment 2.
Figure 8:
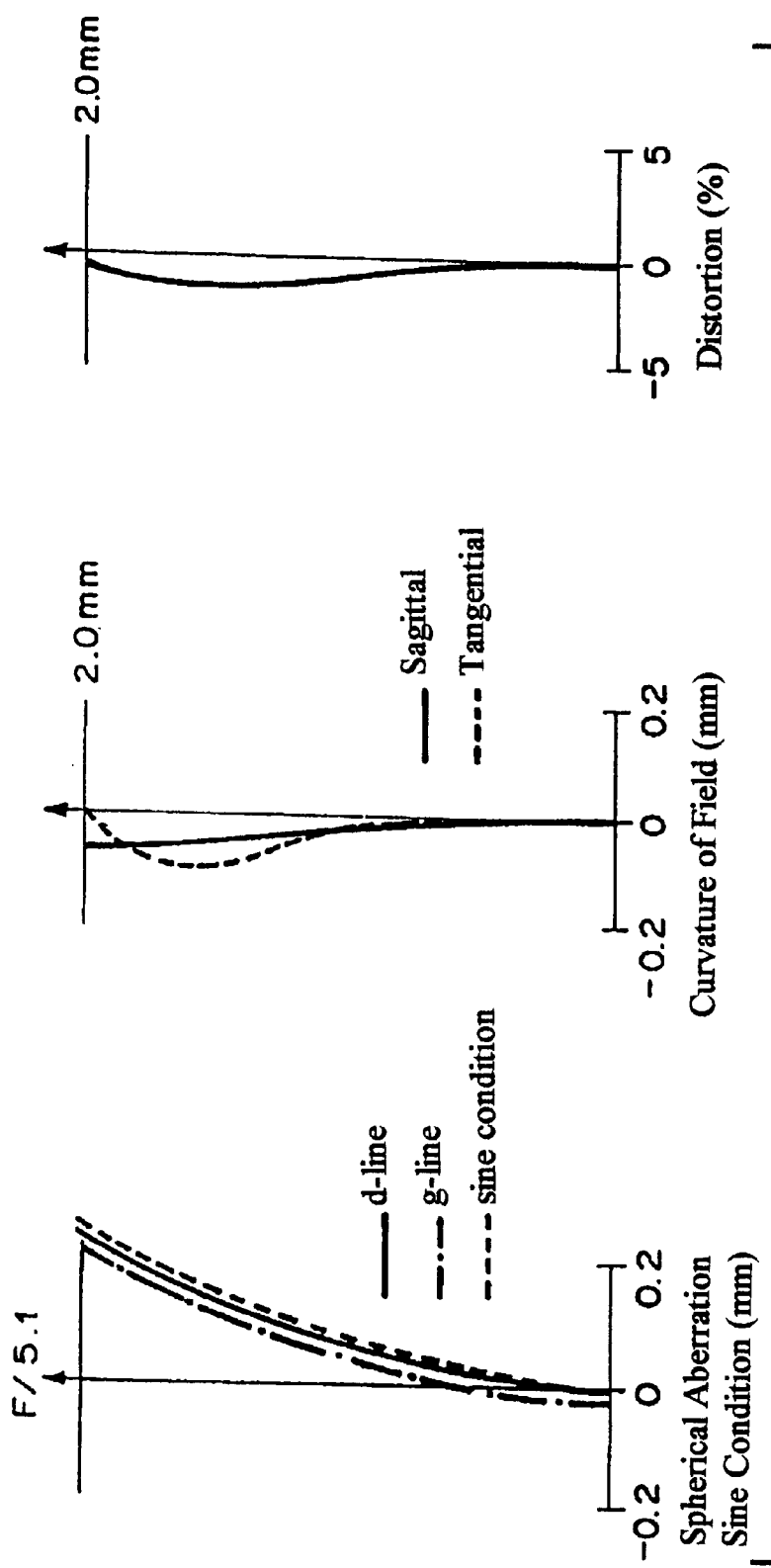
FIG. 8 shows the spherical aberration and sine condition, curvature of field, and distortion at the mid-position of the zoom lens of Embodiment 2.
Figure 9:
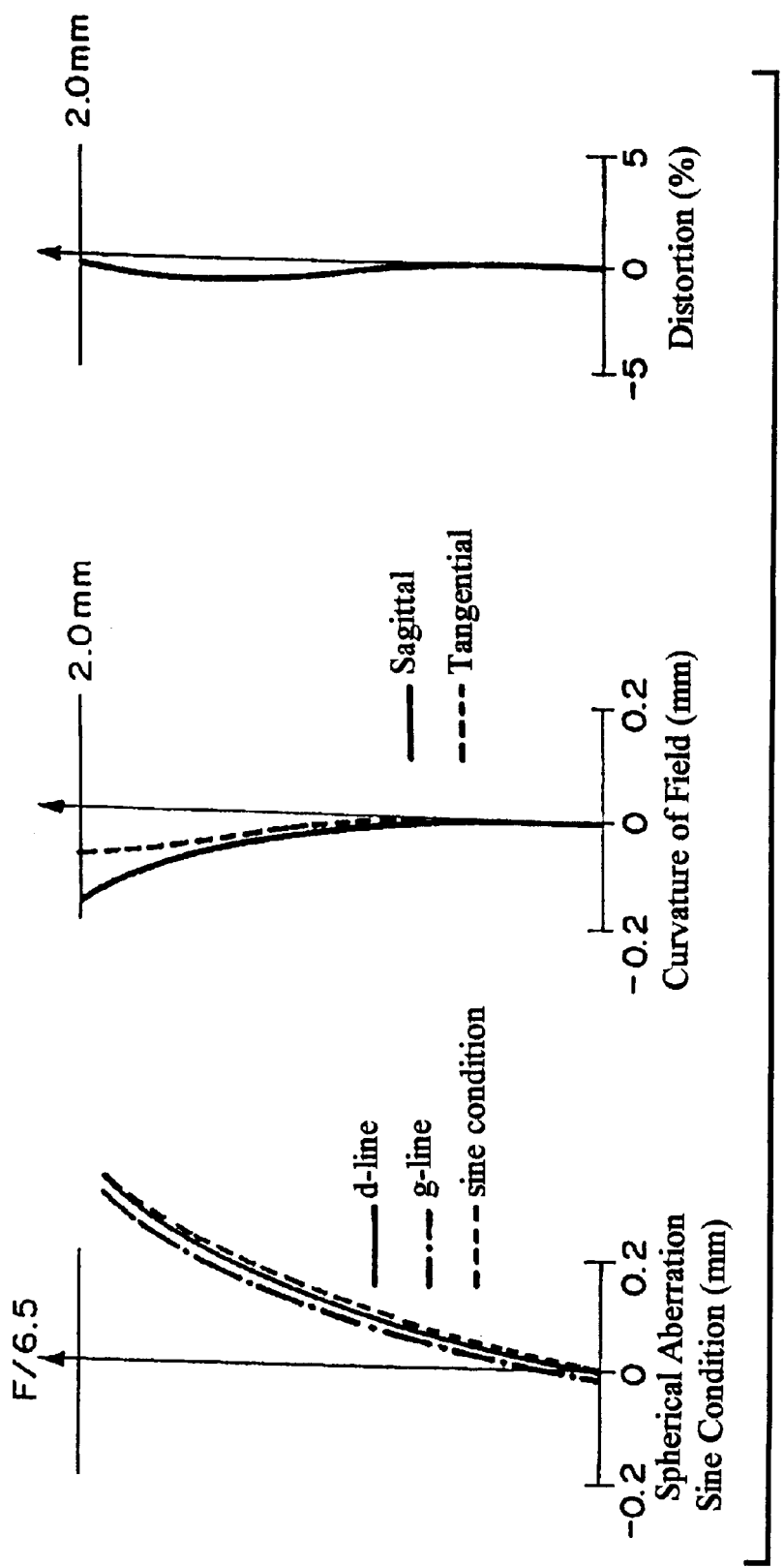
FIG. 9 shows the spherical aberration and sine condition, curvature of field, and distortion at the telephoto end of the zoom lens of Embodiment 2.

FIGS. 7–9 illustrate the spherical aberration and sine condition, curvature of field, and distortion of the wide-angle zoom lens of Embodiment 2 at the wide-angle end (WIDE), the mid-position (MID) and the telephoto end (TELE), respectively. As is made clear in FIGS. 7–9, each of the aberrations is favorable for the wide-angle zoom lens of Embodiment 2.

Embodiment 3

As shown in FIG. 3, the wide angle zoom lens relating to Embodiment 3 is made from lens structures almost identical to the wide angle zoom lens relating to Embodiment 1, but differs in that the third lens group $G_3$ is formed of a third lens element $L_3$ that consists of a biconvex lens. Also, the fourth lens group $G_4$ is formed of a fourth lens element $L_4$ that consists of a negative meniscus lens with its concave surface on the image side and that is cemented to a fifth lens element $L_5$ that consists of a biconvex lens.

Again in this embodiment, the first lens element $L_1$ and second lens element $L_2$ are preferably formed from organic materials. Furthermore, the wide angle zoom lens of Embodiment 3 is also designed to use a quarter-inch diameter CCD array photographic element, and an IR cut-off filter 2 is arranged in the gap between the zoom lens and the photographic element. Once again, however, a low-pass filter having an even greater thickness may be used in lieu of the IR cut-off filter 2.

Table 7, below, shows the surface number # in order from the object side, the radius of curvature R in mm near the optical axis of each surface, the on-axis surface spacing D, the index of refraction $N_d$ for the d-line, and the Abbe constant $V_d$ of each lens element. Also, the spacing $D_e$ of the diaphragm 1 from the image-side of the first lens group is indicated. Those surfaces having a * to the right of the surface number are made to be aspheric with a shape defined by Equation A above.

TABLE 7

| # | R | D | $N_d$ | $v_d$ |
|---|---|---|---|---|
| 1 | 19.1519 | 1.100 | 1.58364 | 30.3 |
| 2* | 2.6329 | $D_2$ (variable) | | |
| 3 | 5.5044 | 2.2500 | 1.49023 | 57.6 |
| 4* | -8.4030 | $D_4$ (variable) | | |
| 5 | 20.5805 | 1.6500 | 1.49023 | 57.6 |
| 6 | -22.7535 | $D_6$ (variable) | | |
| 7 | 22.7163 | 1.0000 | 1.84667 | 23.8 |
| 8 | 2.4592 | 3.0000 | 1.71300 | 53.9 |
| 9 | -14.9159 | 2.0000 | | |
| 10 | ∞ | 0.5500 | 1.51633 | 64.1 |
| 11 | ∞ | | | |

$D_e$ = 4.0712 mm (on the image side from surface #2)

In Table 8 below, the values for each of the constants C, K, $a_4$, $a_6$, $a_8$, and $a_{10}$ of Equation (A) above are given for the aspheric surfaces indicated in Table 7.

TABLE 8

| # | C | K | $a_4$ | $a_6$ | $a_8$ | $a_{10}$ |
|---|---|---|---|---|---|---|
| 2 | 0.3798093 | 0.175629 | $6.8044 \times 10^{-3}$ | $-2.6708 \times 10^{-3}$ | $9.0732 \times 10^{-4}$ | $-1.1809 \times 10^{-4}$ |
| 4 | -0.1190051 | -5.915760 | $1.2531 \times 10^{-3}$ | $1.7286 \times 10^{-5}$ | $1.5840 \times 10^{-6}$ | $-8.8285 \times 10^{-8}$ |

In the upper section of Table 9, below, are given the focal distance f of the wide-angle zoom lens, the f-number $F_{NO}$, the half-image angle ω, the group spacings D, $D_4$ and $D_6$, and the back focus Bf as measured on-axis from surface 11 of filter component 2, for each of the wide-angle end (WIDE), the mid-position (MID), and the telephoto end (TELE) of Embodiment 3.

In the lower section of Table 9 are given the values corresponding to the above Conditions (1) to (4).

TABLE 9

|       | WIDE    | MID    | TELE   |
|-------|---------|--------|--------|
| f     | 2.900   | 4.466  | 5.899  |
| $F_{NO}$ | 2.90 | 4.94   | 5.90   |
| ω     | 34.6°   | 22.1°  | 18.7°  |
| $D_2$ | 9.4185  | 6.3660 | 4.5862 |
| $D_4$ | 1.0500  | 3.5349 | 3.2677 |
| $D_6$ | 1.2750  | 1.8426 | 3.8896 |
| Bf    | 0.539   | 0.539  | 0.539  |

| $f_1/f_w$ | = | −1.85 |
|---|---|---|
| $f_2/f_w$ | = | 2.47 |
| $D_e/f_w$ | = | 1.40 |
| $D_{2w}/f_w$ | = | 3.25 |

As is clearly shown in the lower section of Table 9, the value of $f_1/f_w$ is −1.85, the value of $f_2/f_w$ is 2.47, the value of $D_e/f_w$ is 1.40, and the value of $D_{2w}/f_w$ is 3.25, which respectively satisfy the above conditions (1)–(4).

Figure 10:
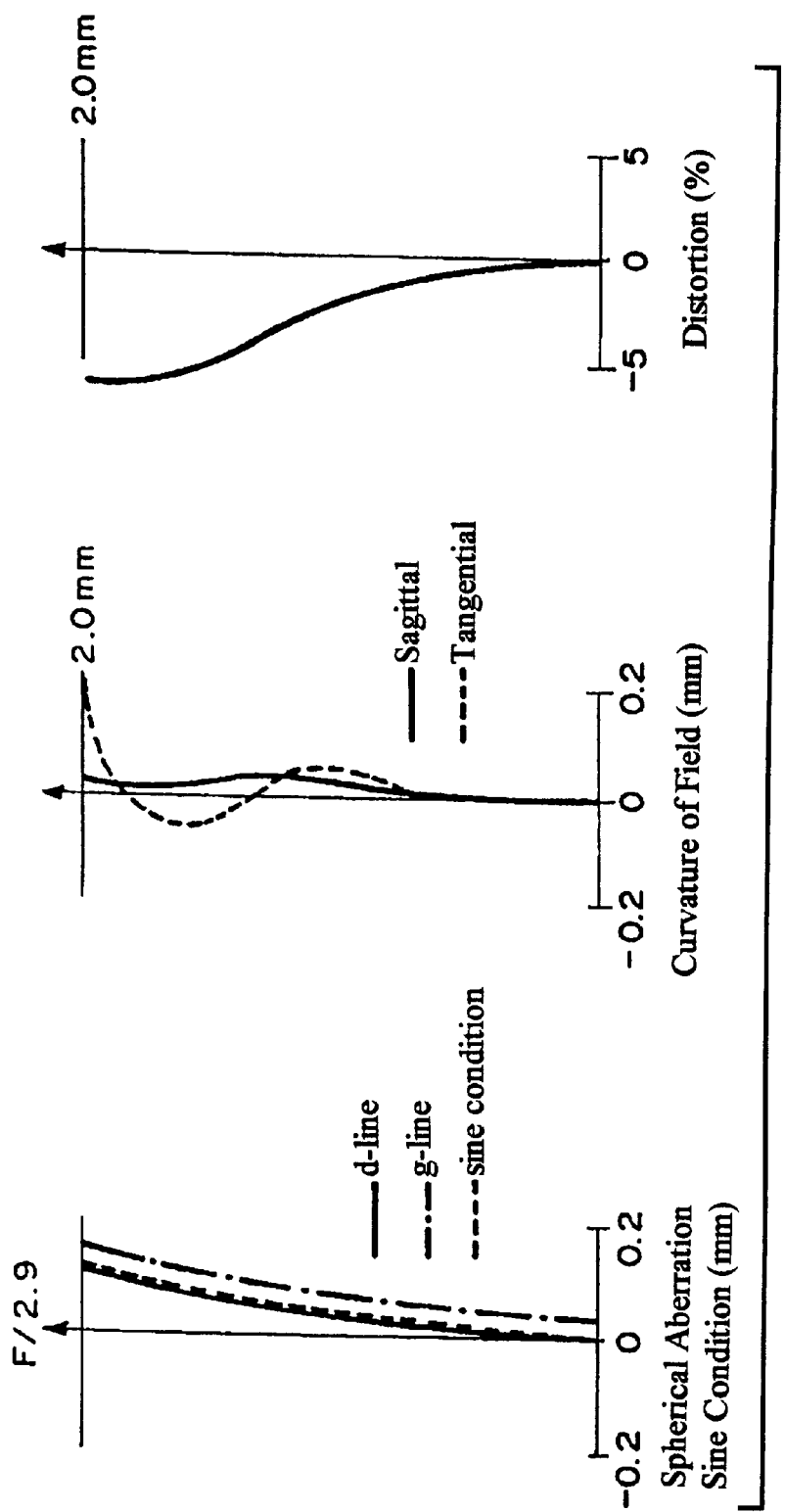
FIG. 10 shows the spherical aberration and sine condition, curvature of field, and distortion at the wide-angle end of the zoom lens of Embodiment 3.
Figure 11:
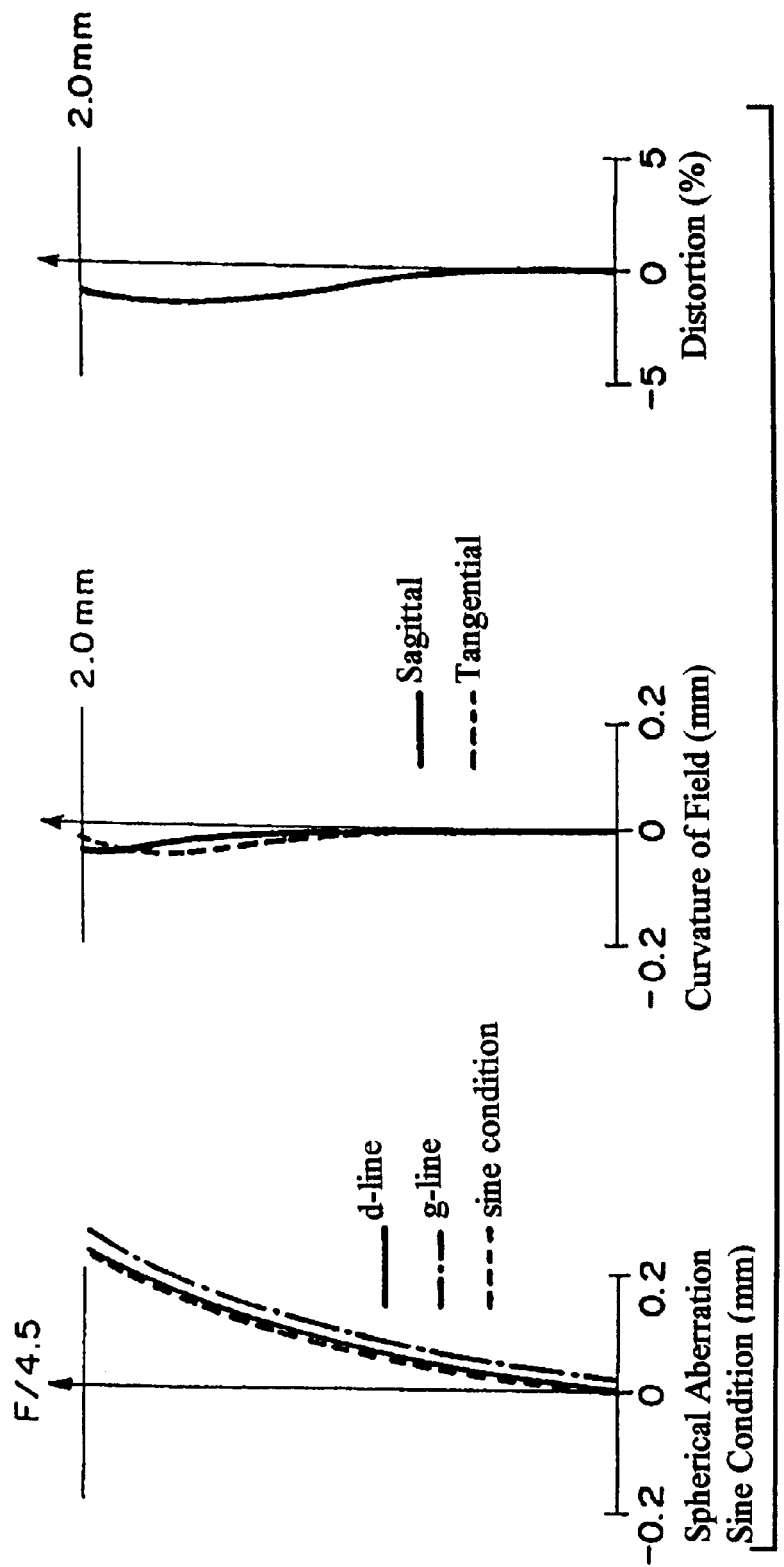
FIG. 11 shows the spherical aberration and sine condition, curvature of field, and distortion at the mid-position of the zoom lens of Embodiment 3.
Figure 12:
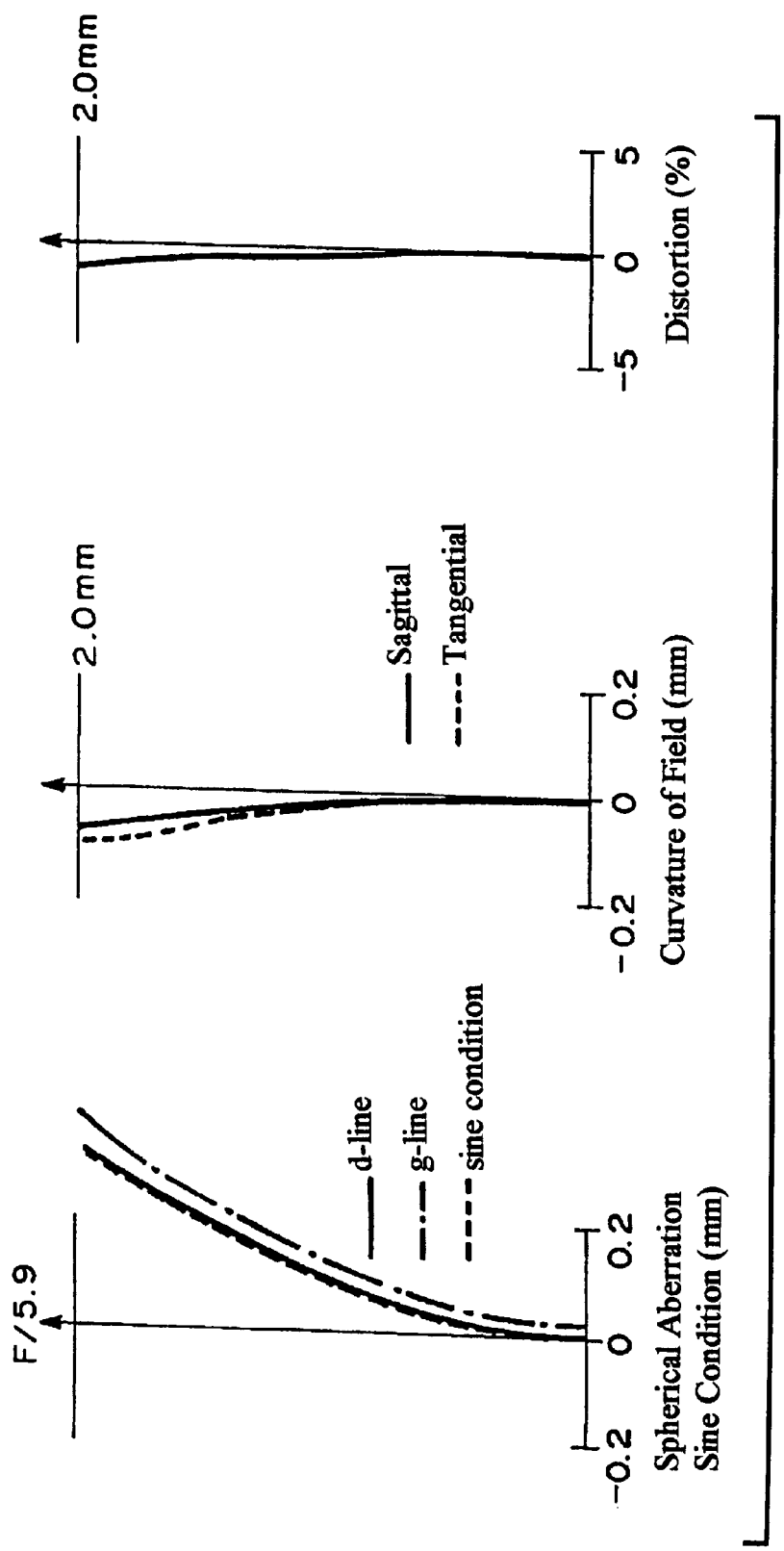
FIG. 12 shows the spherical aberration and sine condition, curvature of field, and distortion at the telephoto end of the zoom lens of Embodiment 3.

FIGS. 10–12 illustrate the spherical aberration and sine condition, curvature of field, and distortion of the wide-angle zoom lens of Embodiment 3 at the wide-angle end (WDE), the mid-position (MID) and the telephoto end (TELE), respectively. As is made clear in FIGS. 10–12, each of the aberrations is favorable for the wide-angle zoom lens of Embodiment 3.

In summary, the present invention includes a first lens group that has negative refractive power, a second lens group that has positive refractive power, a third lens group that has positive refractive power, and a fourth lens group that has positive refractive power. When zooming from the wide-angle end to the telephoto end, the second lens group moves toward the object side, and the third lens group moves so as to maintain the image plane at a fixed position. It is preferred that the first lens group be located near a diaphragm which serves as an aperture stop, as this ensures that the outer diameter of the first lens group can be made small, improves the quality of the image by reducing aberrations such as lateral color and curvature of field, and allows the brightness of the image to be controlled. Further, the off-axis rays that pass through the diaphragm converge due to the strong positive refractive power of each lens group that is arranged on the image side of the diaphragm, enabling the outer diameters of the second through fourth lens groups to be kept small. Furthermore, since the rays forming the image are nearly parallel at both the wide-angle and the telephoto ends, problems such as color shading are avoided, even when a photographic element such as a CCD is used. Thus, the present invention provides a wide-angle zoom lens that employs only a small number of lens elements, forms a high-quality image, and is both compact as well as inexpensive to produce. Furthermore, since magnification by each of the second through fourth lens groups is small, fluctuations in aberrations are small during zooming. Thus, a wide-angle zoom lens is provided that is ideal for use in cameras, particularly in electronic still cameras.

The invention being thus described, it will be obvious that the same may be varied in many ways. Such variations are not to be regarded as a departure from the spirit and scope of the invention. Rather the scope of the invention shall defined as set forth in the following claims and their legal equivalents. All such modifications as would be obvious to one of ordinary skill in the art are intended to be included within the scope of the following claims.

What is claimed is:

1. A wide-angle zoom lens comprising, in order from the object side:

a first lens group of negative refractive power and which includes at least one negative lens element having different radii of curvature on its opposite surfaces, with the smaller radius of curvature surface being concave and on the image side;

a second lens group of positive refractive power and which includes at least one biconvex lens element;

a third lens group of positive refractive power and which consists only of a single positive lens element; and a fourth lens group of positive refractive power;

wherein, in zooming, said first lens group and said fourth lens group remain at a fixed position on the optical axis and said second lens group and said third lens group are moved on the optical axis, thereby changing the focal length of the wide-angle zoom lens while maintaining the image at a fixed position; and the following conditions are satisfied, $$-2.5 < f_1/f_w < -1.5$$

$$2.0 < f_2/f_w < 4.0.$$

where $f_1$ is the focal distance of the first lens group, $f_w$ is the focal distance of wide-angle zoom lens at the wide angle end, and $f_2$ is the focal distance of the second lens group.

2. The wide-angle zoom lens described in claim 1 wherein a diaphragm is arranged in a fixed position axially between said first lens group and said second lens group; and the following conditions are satisfied $$1.1 < D_e/f_w < 2.1$$

$$2.7 < D_{2w}/f_w < 4.3$$

where $D_e$ is the distance, from the surface of said first lens group that is closest to the image side, to said aperture diaphragm;

$D_{2w}$ is the on-axis distance between said first lens group and said second lens group, at the wide angle end; and, $f_w$ is the focal distance of wide-angle zoom lens at the wide-angle end.

3. The wide-angle zoom lens described in claim 1 wherein said first lens group consists only of a single negative lens element, and at least one surface of said negative lens element is aspherical.

4. The wide-angle zoom lens described in claim 1 wherein said second lens group consists only of a biconvex lens element, and at least one surface of said biconvex lens element is aspherical.

5. The wide-angle zoom lens described in claim 2 wherein said first lens group and said second lens group each have at least one lens element that is composed from organic material.

6. The wide-angle zoom lens described in claim 2, wherein said fourth lens group consists only of two lens elements that are cemented together.

7. The wide-angle zoom lens according to claim 1, said wide-angle zoom tens further having the following construction:

| # | R | D | $N_d$ | $v_d$ |
|---|---|---|---|---|
| 1 | 13.3610 | 1.100 | 1.49023 | 57.6 |
| 2 | 2.2525 | $D_2$ (variable) | | |
| 3 | 5.0223 | 2.2500 | 1.49023 | 57.6 |
| 4 | −36.6484 | $D_4$ (variable) | | |
| 5 | 4.7555 | 1.6500 | 1.49023 | 57.6 |
| 6 | 8.9267 | $D_6$ (variable) | | |
| 7 | 15.9766 | 3.0000 | 1.77250 | 49.6 |
| 8 | −3.0277 | 1.0000 | 1.84666 | 23.8 |
| 9 | −22.9313 | 2.0000 | | |
| 10 | ∞ | 0.5500 | 1.51633 | 64.1 |
| 11 | ∞ | | | | where # is the surface number in order from the object side, R is the radius of curvature in mm near the optical axis of each lens element surface, D is the on-axis surface spacing in mm, $N_d$ is the refractive index for the d-line and $v_d$ is the Abbe constant of each lens element, $D_2$ is in the range 10.0068–5.4033, $D_4$ is in the range 1.0500–2.3205, and $D_6$ is in the range 1.2750–4.9506.

8. The wide-angle zoom lens according to claim 1, said wide-angle zoom lens further having the following construction:

| # | R | D | $N_d$ | $v_d$ |
|---|---|---|---|---|
| 1 | 7.5862 | 1.100 | 1.58364 | 30.3 |
| 2 | 2.2049 | $D_2$ (variable) | | |
| 3 | 5.4069 | 2.2500 | 1.49023 | 57.6 |
| 4 | −10.3207 | $D_4$ (variable) | | |
| 5 | 5.1943 | 1.6500 | 1.49023 | 57.6 |
| 6 | 10.3105 | $D_6$ (variable) | | |
| 7 | −24.6432 | 1.0000 | 1.84667 | 23.8 |
| 8 | 2.9933 | 3.0000 | 1.71300 | 53.9 |
| 9 | −5.6010 | 2.0000 | | |
| 10 | ∞ | 0.5500 | 1.51633 | 64.1 |
| 11 | ∞ | | | | where # is the surface number in order from the object side, R is the radius of curvature near the optical axis in mm of each lens element surface, D is the on-axis surface spacing in mm, $N_d$ is the refractive index for the d-line and $v_d$ is the Abbe constant of each lens element, $D_2$ is in the range 10.2720–4.5862, $D_4$ is in the range 1.0500–4.2464, and $D_6$ is in the range 1.2750–3.8901.

9. The wide-angle zoom lens according to claim 2, said wide-angle zoom lens having the following construction:

| # | R | D | $N_d$ | $v_d$ |
|---|---|---|---|---|
| 1 | 19.1519 | 1.100 | 1.58364 | 30.3 |
| 2 | 2.6329 | $D_2$ (variable) | | |
| 3 | 5.5044 | 2.2500 | 1.49023 | 57.6 |
| 4 | −8.4030 | $D_4$ (variable) | | |
| 5 | 20.5805 | 1.6500 | 1.49023 | 57.6 |
| 6 | −22.7535 | $D_6$ (variable) | | |
| 7 | 22.7163 | 1.0000 | 1.84667 | 23.8 |
| 8 | 2.4592 | 3.0000 | 1.71300 | 53.9 |
| 9 | −14.9159 | 2.0000 | | |
| 10 | ∞ | 0.5500 | 1.51633 | 64.1 |
| 11 | ∞ | | | | where # is the surface number in order from the object side, R is the radius of curvature near the optical axis in mm of each lens element surface, D is the on-axis surface spacing in mm, $N_d$ is the refractive index for the d-line and $v_d$ is the Abbe constant of each lens element, $D_2$ is in the range 9.4185–4.5862, $D_4$ is in the range 1.0500–3.5349, and $D_6$ is in the range 1.2750–3.8896.

* * * * *

UNITED STATES PATENT AND TRADEMARK OFFICE
CERTIFICATE OF CORRECTION

PATENT NO : 6,088,169
DATED : July 11, 2000
INVENTOR(S): OHNO

It is certified that error appears in the above-identified patent and that said Letters Patent are hereby corrected as shown below:

At col. 5, line 29, insert a period after "reduced".

At col. 10, line 59, change "spacings D, $D_4$" to -- spacings $D_2$, $D_4$ --.

Signed and Sealed this

Seventeenth Day of April, 2001

Attest:

NICHOLAS P. GODICI

Attesting Officer

Acting Director of the United States Patent and Trademark Office